UNITED STATES PATENT OFFICE.

HERMANN BOEDEKER, OF HÖCHST-ON-THE-MAIN, GERMANY, ASSIGNOR TO THE FARBWERKE, VORMALS MEISTER, LUCIUS & BRÜNING, OF SAME PLACE.

RHODAMIN DYE.

SPECIFICATION forming part of Letters Patent No. 641,184, dated January 9, 1900.

Application filed December 29, 1897. Serial No. 664,437. (Specimens.)

*To all whom it may concern:*

Be it known that I, HERMANN BOEDEKER, doctor of philosophy, a subject of the Emperor of Germany, residing at Höchst-on-the-Main, Germany, have invented certain new and useful Improvements in the Manufacture of Dyestuffs from Phthalic Acid Rhodamins and Aromatic Bases, (for which I have obtained Letters Patent in Germany, No. 75,500, dated July 1, 1893; in England, No. 14,207, dated July 22, 1893, and in France, No. 231,700, dated July 22, 1893,) of which the following is a specification.

This invention relates to the production of dyestuffs from phthalic acid rhodamins and aromatic bases.

I have found that by the action of aromatic bases upon the alkylated meta-amidophenol-phthaleïns (rhodamins) under appropriate conditions a whole series of new derivatives may be produced, which distinguish themselves from the dyestuffs used as primary material by their bluer tints, and particularly by their great affinity to the vegetable fiber.

I illustrate the manufacture by the following example: Ten kilos hydrochlorid of diethylrhodamin are given to twenty monomethylanilin, to which are slowly added, with good cooling and stirring, 2.4 kilos phosphorus oxychlorid, in order that the temperature does not rise above 20° to 25° centigrade. After some hours' standing the mass is poured into water, the excess of methylanilin is dissolved on addition of hydrochloric acid, and the dyestuff is precipitated with common salt. To purify, it is again dissolved with warm water and filtered. From this solution, to which, if too diluted, some salt is added, the new product crystallizes out in small green laminæ of metallic luster, forming after filtration and drying a dark-red powder of green luster soluble in water with a red color. Its alcoholic solution shows a vivid fluorescence. It is soluble in concentrated sulfuric acid with a yellow color and dyes mordanted cotton a fiery pink. Tetraethylrhodamin reacts exactly as diethylrhodamin.

Instead of the monomethylanilin mentioned in the above example other aromatic secondary and tertiary bases, as monoethylamin, dimethyl- and diethyl-anilin, chinolin, monethyl-ortho-toluidin, dibenzylanilin may be combined with rhodamins to dyestuffs in the manner described, which distinguish themselves from the primary material by their stronger basic character, their bluer tints, greater fastness to the vegetable fiber, and greater solubility in water. Primary aromatic bases, however, are not applicable for the process described.

Having now described my invention, what I claim is—

As a new dyestuff, the product resulting from the simultaneous action of phosphoroxychlorid and one of the specified aromatic bases upon symmetric diethylrhodamin as herein described, being a red powder of green metallic luster, soluble in water with a red color, in alcohol with a vivid fluorescence, and in concentrated sulfuric acid with a yellow color, crystallizing from water in green laminæ of metallic luster, and dyeing cotton a fiery pink, substantially as set forth.

In testimony that I claim the foregoing as my invention I have signed my name in presence of two subscribing witnesses.

HERMANN BOEDEKER.

Witnesses:
HEINRICH HAHN,
ALFRED BRISBOIS.